Dec. 14, 1937.  C. W. DANN  2,102,407
CONTROL DEVICE AND THE PRODUCTION THEREOF
Filed April 28, 1934   3 Sheets-Sheet 1
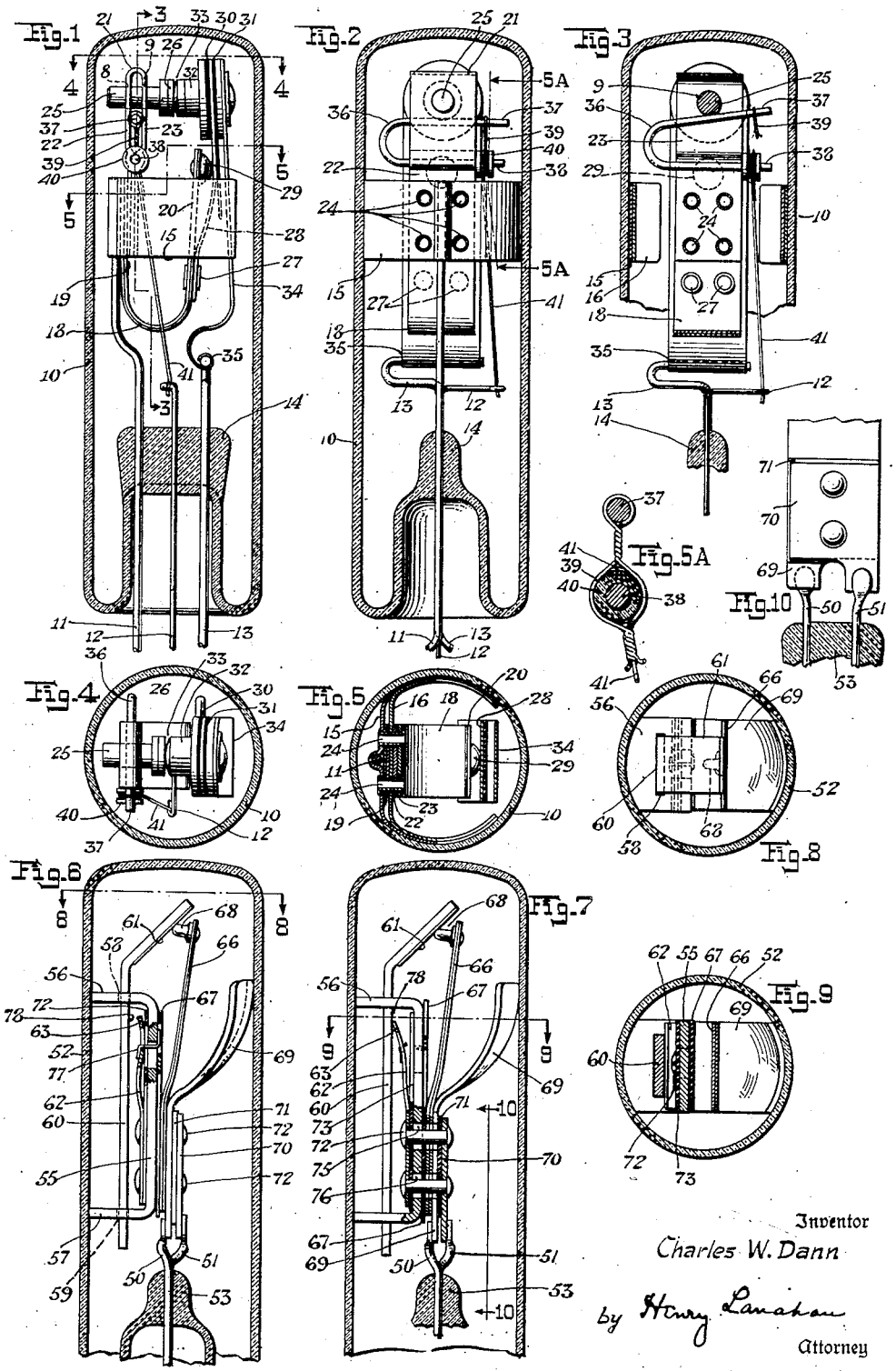
Inventor
Charles W. Dann
by Henry Lanahan
Attorney

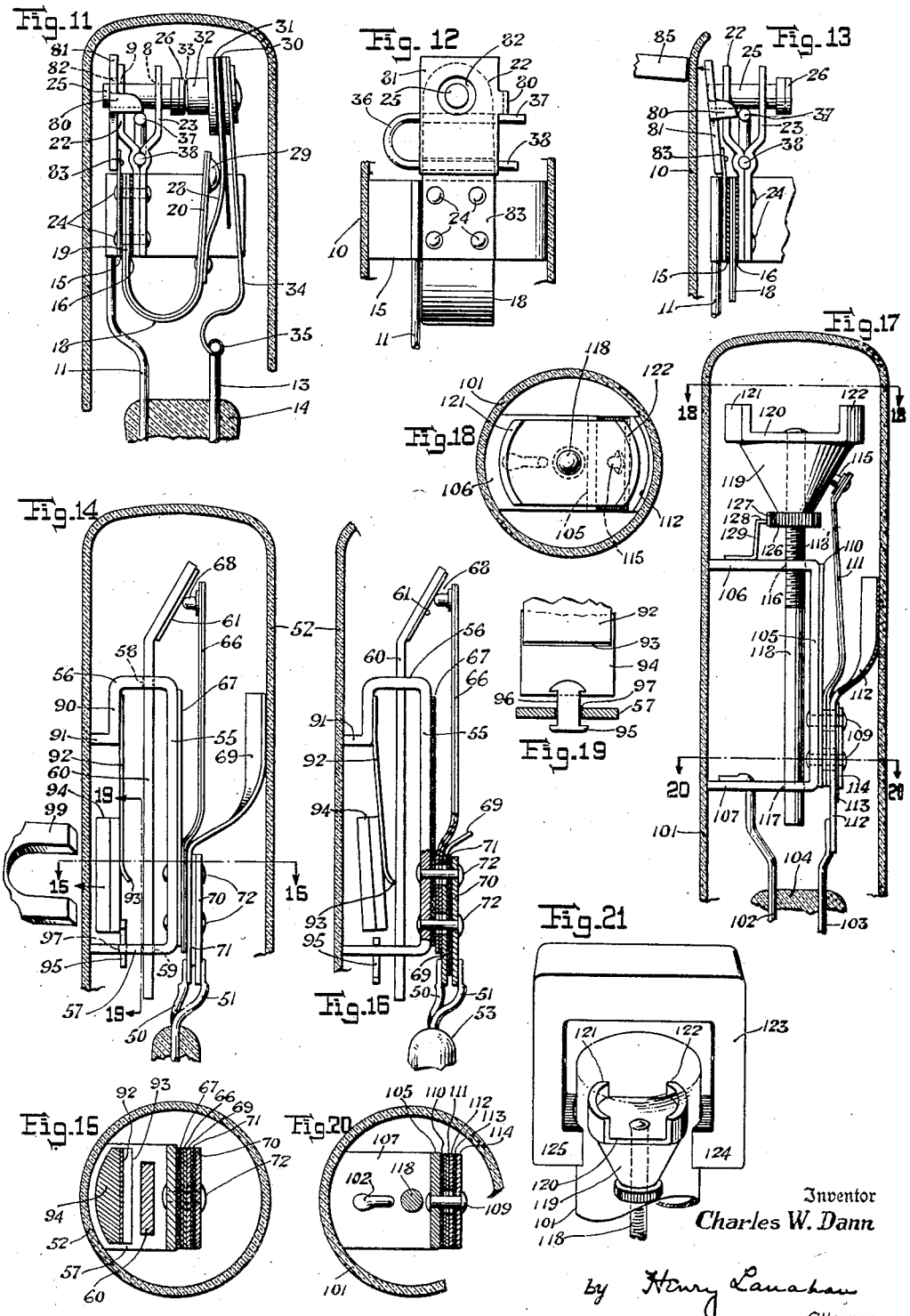

Dec. 14, 1937.   C. W. DANN   2,102,407
CONTROL DEVICE AND THE PRODUCTION THEREOF
Filed April 28, 1934   3 Sheets-Sheet 3
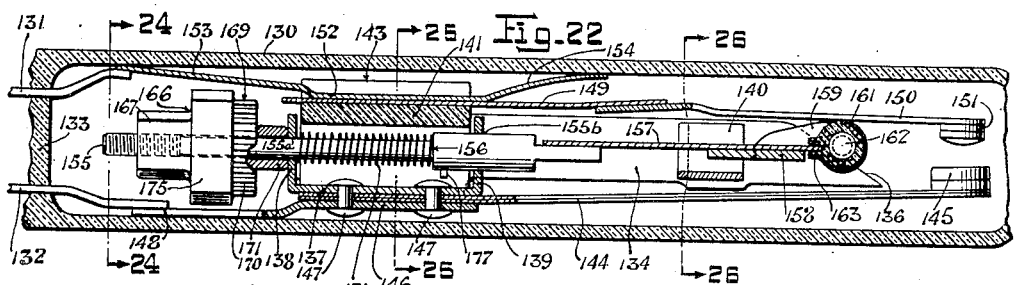
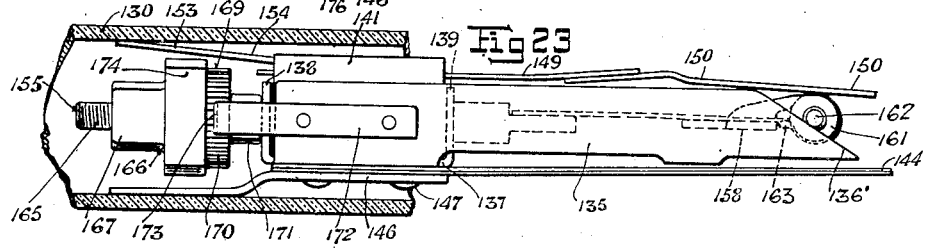
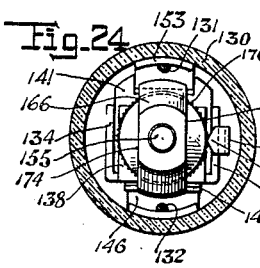
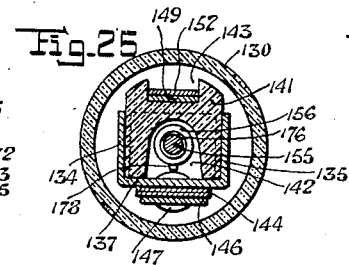
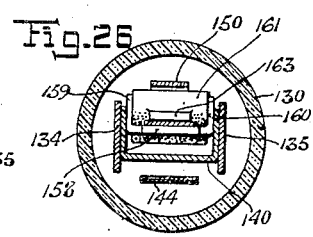
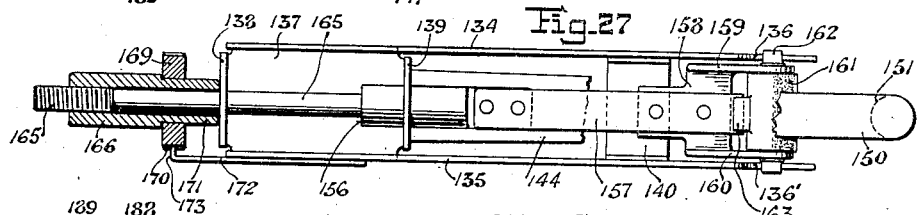
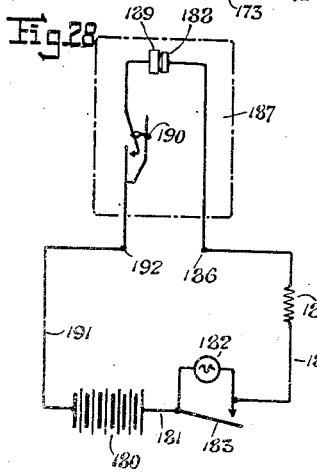
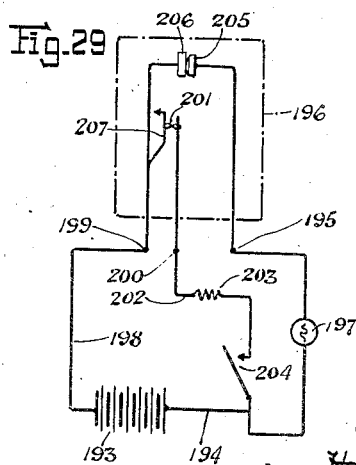
INVENTOR
Charles W. Dann
by Henry Lanahan
ATTORNEY Patented Dec. 14, 1937

2,102,407

UNITED STATES PATENT OFFICE 2,102,407

CONTROL DEVICE AND THE PRODUCTION THEREOF

Charles W. Dann, East Orange, N. J., assignor, by mesne assignments, to Thomas A. Edison, Incorporated, West Orange, N. J., a corporation of New Jersey Application April 28, 1934, Serial No. 722,960

36 Claims. (Cl. 200—138)

The present invention relates to control devices and the production thereof, and more particularly to improved devices for controlling electric circuits of the type comprising a contact member movable under the influence of a thermo-sensitive member to open and/or close a circuit under certain predetermined conditions. This invention also particularly relates to such control devices which are adjustable so as to operate under a predetermined condition or, within limits, under any desired condition, to the setting or locking thereof in adjustment, and also to novel methods of producing and adjusting such control devices.

It has heretofore been common practice hermetically to seal the operating or switching structures of control devices of the character referred to in evacuated or gas filled containers having suitable leads extending therefrom for connection in the electric circuits to be controlled. It has also been customary to adjust the operating or switching structure of such a control device to operate at a predetermined temperature and to set or lock the same in such adjustment before the ensealing thereof in the container. However, according to prior practices, if it were desired to adjust or to change the adjustment of the switching structure after being sealed in the container, it was first necessary to break the seal.

There is likely to be a distinct lag in operation of such control devices as heretofore constructed, where the operation depends upon external sources of heat. According to prior practices the supporting structure for the thermo-sensitive member of such a control device had but a comparatively small area contacting or in heat conducting relation with the walls of the container, with the results that but little heat was conducted through the supporting structure to the thermo-sensitive member, and that radiation and/or conduction through gas were largely relied on for the transfer of external heat to said member.

Such practices as those above recited have been found to be disadvantageous because the accuracy of the adjustment of a control device is likely to be disturbed to some extent by the subsequent sealing and evacuation of the container during which the structure within the container may be exposed to a relatively high temperature. I have also found that where the control device is of the relay type and a deflection of the thermo-sensitive member depends on a source of heat disposed internally of the container, the accuracy of the adjustment made before sealing the container, may be disturbed to some extent by the operation of sealing the evacuated or gas filled container, with the switching structure therein. Also, where the control device switching structures are produced in quantity and stored for any material period before being sealed in the containers, the adjustments and settings cannot be made at the time of production without the likelihood of slight changes occurring in the adjustments of such structures by the time they are sealed in their containers. And further, when it was desired to alter the adjustment after sealing of the switching structure in the container, it has been necessary to break the seal of the container in order to make the desired adjustment and to lock the structure in such adjustment. This is inconvenient and involves a considerable loss of time, and also the additional expense of resealing the switching structure in a container, and usually of supplying an entirely new container.

It is obvious that if the adjustment and locking or setting of the switching structure may be effected after the sealing of such structure in a container, the above disadvantages will be obviated, inasmuch as a greater degree of accuracy in adjustment may be obtained, alterations in adjustment may be effectively and readily made, and control devices of the class referred to may be more quickly and economically produced.

Accordingly, one object of my invention is to provide a control device structure generally of the character described above, which may be easily adjusted and then set or locked in such adjusted position after the sealing thereof in an evacuated or gas filled container, all without disturbing the seal of the container.

Another object of my invention is to provide a control device structure which after the sealing thereof in a container and also after actual use of the control device, may without disturbing the seal of the container, be repeatedly adjusted and set or locked at will.

Another object of my invention is to provide a control device structure which will rapidly effect the transmittal of external heat to the sealed thermo-sensitive member, thus avoiding any substantial lag in the operation of the control device.

A still further object of my invention is to provide novel methods of adjusting and setting or locking the switching structure of a control device while disposed within a sealed container.

Another and further object of my invention is to provide novel methods of altering the adjustment of the switching structure of a control device while disposed within a sealed container.

Other and further objects of my invention will be obvious upon an understanding of the preferred embodiments and methods about to be described, or will be indicated in the appended claims, and various advantages not specifically referred to herein will occur to one skilled in the art upon the employment of my invention in practice.

In order that my invention may be more clearly understood, preferred embodiments have been chosen for purposes of illustration and description, and are shown in the drawings which accompany and form a part of this specification, and in which:

Fig. 1 is an elevation, partly in section, of one form of a control device in accordance with my invention;

Fig. 2 is an elevation, partly in section, of the control device shown in Fig. 1, looking from the left of the latter figure;

Fig. 3 is a section on line 3—3 of Fig. 1;

Fig. 4 is a section on line 4—4 of Fig. 1;

Fig. 5 is a section on line 5—5 of Fig. 1;

Fig. 5A is an enlarged sectional view, taken on line 5A—5A of Fig. 2, illustrating the structure by which the locking member of the control device shown in Figs. 1–3 is held open prior to the adjustment and setting of such device;

Fig. 6 is an elevation, partly in section and partly broken away, illustrating a modified form of control device embodying features of my invention;

Fig. 7 is an elevational view, partly in section and partly broken away, of the control device of Fig. 6, showing the changed positions of certain elements thereof after adjustment and setting of the device;

Fig. 8 is a sectional view taken on line 8—8 of Fig. 6;

Fig. 9 is a sectional view taken on line 9—9 of Fig. 7;

Fig. 10 is a fragmental elevation, partly in section, of the control device shown in Fig. 7 as viewed from line 10—10 thereof;

Fig. 11 is a fragmental elevation, partly in section, illustrating another modified form of control device embodying features of my invention;

Fig. 12 is a fragmental elevation, partly in section, of the control device shown in Fig. 11 as viewed from the left of the latter figure;

Fig. 13 is a fragmental elevation, partly in section, of the control device illustrated in Fig. 11, with the locking or setting member held released by the magnet shown;

Fig. 14 is a fragmental elevation, partly in section, showing another modified form of control device embodying features of my invention, together with a device for effecting the setting of the switching structure after the sealing of the container;

Fig. 15 is a sectional view taken on line 15—15 of Fig. 14;

Fig. 16 is a fragmental elevation, partly in section, of the control device illustrated in Fig. 14, with the locking member shown in operative position;

Fig. 17 is an elevational view, partly in section and partly broken away, of another modified form of control device embodying features of my invention;

Fig. 18 is a sectional view taken on line 18—18 of Fig. 17;

Fig. 19 is a sectional view taken on line 19—19 of Fig. 14;

Fig. 20 is a fragmental view taken on line 20—20 of Fig. 17;

Fig. 21 is a view of the upper portion of the control device shown in Fig. 17 and illustrating certain adjusting means associated with such device;

Fig. 22 is a longitudinal sectional view, partly in elevation, of still another modified form of control device embodying features of my invention;

Fig. 23 is a fragmentary side elevation of the switching structure shown in Fig. 22, with a portion of the container for such structure shown in cross section;

Fig. 24 is a sectional view taken on line 24—24 of Fig. 22;

Fig. 25 is a sectional view taken on line 25—25 of Fig. 22;

Fig. 26 is a sectional view taken on line 26—26 of Fig. 22; and

Fig. 27 is a top plan view of a portion of the switching structure shown in Fig. 22.

For the purpose of more clearly illustrating various features of my invention, the structures are shown in Figs. 1 to 27 inclusive as considerably enlarged.

Fig. 28 is a diagrammatic view of an electric circuit which may be used to facilitate the adjustment and locking or setting of certain forms of my improved control device, and which is particularly adapted to be employed in locking the control device illustrated in Figs. 6 to 10 inclusive; and Fig. 29 is a diagrammatic view showing another electrical circuit which I may use in adjusting and locking or setting certain forms of my control device, and which is particularly adapted to be employed in locking the control device shown in Figs. 1 to 5A inclusive.

Referring to the drawings, and for the present more particularly to the form of control device illustrated in Figs. 1 to 5A, reference character 10 represents a hermetically sealed container, preferably though not necessarily formed of glass, having lead wires 11, 12, and 13 sealed in and extending through the base 14 thereof. Internally of the container, the lead wire 11 is connected with a broad flat band 15 which is substantially U-shaped in cross section and is formed of suitable electrical and thermal conductive material such as copper, for example. The band 15 is so shaped and so disposed in the container 10, that the greater portion of the outer lateral surface thereof will closely conform to the inner surface of the container (see Fig. 5). A spring member 16 also preferably formed of electrical and thermal conductive material and of substantially the same form as band 15, is disposed within the latter so as to press the same against the inner lateral surface of the container 10, to thereby frictionally maintain the band and the structures supported thereon in proper position within the container, as shown in Figs. 1 and 2. The lead wire 11 also assists to some extent, in maintaining the band 15 and other elements of the switching structure in such position. A downwardly extending and substantially U-shaped member 18 formed of thermo-sensitive material, such as a bi-metallic element, for example, has one leg 19 secured to the spring 16 in a manner presently to be described. An upwardly extending and substantially inverted U-shaped member 21 having its legs 22 and 23, joined together at their lower extremities, is also connected to the spring 16. The band 15, spring 16, bi-metallic member 18 and member 21 are suitably secured in the assembled relation shown in Fig. 5, as by rivets or cleats indicated at 24. From the foregoing it will be apparent that the broad flat band 15 will be effectively exposed to external heat to which the exterior of the container 10 may be subjected, that the leg 19 of the heat sensitive member 18 has a substantial surface portion thereof in intimate thermal contact with the band 15, and that the entire switching structure is supported in the position shown by the frictional engagement of the band 15 with the inner lateral surface of the container 10 under the action of spring 16 and by the lead 11.

The upper portions of the legs 22 and 23 of member 21 are respectively provided with aligned openings 8 and 9 in which is freely supported a contact stud or pin 25 provided with a slightly enlarged head having a suitable contact face 26. Connected to the leg 20 of the heat sensitive member 18, as by rivets 27, is a contact carrying member 28 formed of readily yieldable metallic material, such as weak spring steel, for example, and to the extreme upper end of leg 20 is secured a nib or button 29, the arrangement being such that as the member 18 deflects when subjected to certain temperatures the nib 29 may cooperate with the spring member 28 to cause a corresponding displacement thereof. Secured to the upper end of spring member 28, but electrically insulated therefrom, as by mica bushings 30 and 31, is a contact stud 32 having the contact face 33 which is thus supported in alignment with contact face 26. Secured to the outer end of stud 32 is a strip of easily flexed and electrically conducting material 34, the lower end of which is connected to lead 13 at 35. It should be noted that stud 32 is supported by spring member 28 and not by member 34, and that the latter member is not electrically connected with member 28.

As stated above, the contact stud 25 is freely movable within certain obviously fixed limits, in the openings 8 and 9 in U-shaped member 21. Therefore, if the container 10 is properly positioned, the contact stud 25 may by its own weight be maintained in contact with contact stud 32. I provide novel means and methods about to be described, for adjusting and setting or locking stud 25 with respect to member 21 and in desired relation with respect to contact stud 32.

A strong and substantially U-shaped spring locking member 36 is supported in such position between the legs of the U-shaped member 21 as by having the leg 38 thereof firmly clamped between the legs 22 and 23 of member 21, (see Fig. 1), that the leg 37 thereof is biased, under the inherent resiliency of the locking member, to engage and press upwardly (referring to Figs. 1-3) against the stud 25 to set or lock the latter. Prior to adjustment of the control device and locking of the stud 25, however, the leg 37 of member 36 is held from engagement with said stud 25 by a comparatively fine high resistance wire 39 which is looped about the leg 37 and twisted around an insulator 40 secured to the other leg 38 of member 36. The ends of wire 39 extend slightly below insulator 40 and are connected together and to a comparatively low resistance wire 41, as by twisting (see Figs. 1, 2, 3, and 5A). The wire 41 is connected with the lead 12 which extends through the container base 14 and is also looped about the insulator 40.

In adjusting and setting the control device to make or break (as the case may be) the circuit of leads 11 and 13, upon the leg 20 of the thermo-sensitive member reaching a predetermined temperature and position, I prefer to proceed as follows:

With the stud 25 free to move in openings 8 and 9, I place the container 10 horizontally on its right hand side, referring to Fig. 1. In this position of the container contact stud 25 is free to move to follow contact stud 32 either by virtue of its own weight acting in one direction, or by virtue of the influence of spring 28 acting in the other direction. The sealed container is then placed in a suitable thermal bath or calorimeter provided with a thermometer. The temperature of the thermal bath is brought to and maintained at the desired predetermined temperature for which the control device is to be adjusted, so that thermosensitive member 18 will reach the same temperature. When this occurs and the action of the thermo-sensitive member 18 has stabilized, the lead wires 11 and 12 are connected with a source of electric energy sufficient to fuse the high resistance link 39, whereupon the leg 37 of spring 36 is released, as indicated in Fig. 3, and forces the stud 25 against the walls of the openings 8 and 9 to thereby lock stud 25 in fixed position in its mounting. If spring 36 is sufficiently strong, no further securing of the stud 25 is necessary. However, it will be obvious that if desired the walls of the openings 8 and 9 may be roughened, serrated or sharpened, and that the shank of stud 25 may be coated with or made of some comparatively soft and electrically conductive material such as copper or silver, for example, so that the stud will be more securely locked by engagement of its shank with the walls of openings 8 and 9. After the control device is thus adjusted and locked, so as to operate at the desired predetermined temperature, the lead wire 12 has no further function and may, if desired, be broken off outside the container 10. The circuit of the current which fuses the link 39 is as follows:

From lead 12 through conductor 41, fusible wire or link 39, legs 37 and 38, U-shaped member 21, spring 16, leg 19 of the thermo-sensitive member 18, and member 15 to the lead wire 11. The path of the electrical circuit of the device after the fusing of link 39 is as follows:

From lead 13 through flexible member 34, stud 32, stud 25 (if the contact members are closed), member 21, spring 16, leg 19 of member 18, and member 15 to the lead wire 11.

In the form of control device shown in Figs. 6 to 10, lead wires 50 and 51 enter an hermetically sealed container 52 through the base 53 thereof. Disposed within the container 52 is a substantially U-shaped supporting bracket 55 the legs 56 and 57 of which have their outer extremities contiguous and conforming to the inner lateral surface of the container. The legs 56 and 57 are respectively provided with aligned openings 58 and 59 in which is freely mounted a contact member or rod 60 provided with a suitable inclined or biased contact face 61 adapted to cooperate with contact 68 for purposes of adjustment and for making contact. A conductive locking member 62 formed of a comparatively strong spring material, is secured to the base of the U-shaped member 55, is electrically insulated therefrom by an insulator 73, and is provided with a slightly outwardly projecting sharp upper end portion 63 which is biased under the inherent resiliency of member 62, to engage and press outwardly on the contact member 60. A thermosensitive member 66 is secured to the base of bracket 55, at the side thereof opposite that which is adjacent member 62, and is electrically insulated from the bracket by an insulation strip 67. Member 66 extends upwardly and away from bracket 55 (see Fig. 6) and carries a suitable contact member or nib 68 adapted to engage and disengage the face 61 of contact member 60 under certain conditions. A supporting spring member 69 is positioned with a lower portion thereof in engagement with member 66, and with the upper portion thereof curving outwardly and upwardly and biased under its own resiliency, to a position in which it frictionally engages the inner lateral surface of container 52 substantially diametrically opposite the engagement thereof by legs 56 and 57 of bracket 55. It will thus be apparent that member 69 acts, in cooperation with the leads 50 and 51, which are respectively connected to members 69 and 70, to support bracket 55 and the parts carried thereby in the position shown. Spring member 69 is separated and insulated from an electrically conductive plate 70 by an insulation strip 71. Locking member 62, insulating strips 73 and 67, thermo-sensitive member 66, supporting member 69, insulating strip 71 and plate 70 are firmly secured to bracket 55 in the positions shown in Figs. 6 and 7, as by rivets 72. The insulating strips 67, 71 and 73 also, in effect, serve as bushings to prevent electrical contact between rivets 72 and elements 55, 66, and 69 where the rivets pass therethrough, as the openings provided in such elements for said rivets are enlarged and said insulating strips extend across said openings (see Fig. 7).

Before sealing the switching assembly just described in the container 52, the end portion 63 of the spring locking member 62 is secured in the position shown in Fig. 6 by an element 77 consisting of a short ribbon or wire of comparatively high electrical resistance material and constituting a fusible link. The ends of fusible link 77 may be respectively suitably secured, as by spot welding, to member 62 and bracket 55.

The adjustment and setting of the control device just described so that it will operate at a predetermined temperature, may be effected in the following manner:

The container 52 may be vertically disposed in a suitable setting bath or calorimeter of proper temperature, in which position of the container the contact member 60, under its own weight, will tend to move downwardly in the openings 58 and 59 until its biased contact surface 61 engages contact nib 68, and thus effect relative adjustment of the point of contact between contacts 61 and 68. The container 52 may, however, be disposed in the setting bath with its longitudinal axis at such an inclination that the contact member 60 will still move (but not quite so readily) in openings 58 and 59 under its own weight; or the container may be so inclined in the bath that the contact member 60 will not under the influence of its weight alone, move downwardly in openings 58 and 59. In either of the latter two cases, the sliding movement of the contact member 60 may, if desired, be accentuated or initiated by gently vibrating the wall of container 52, as by an electric buzzer, or otherwise. If the container 52 is placed in the bath in such a position that the contact member 60 will move very freely under the action of gravity, the weight of such contact member combined with the action of the inclined surface 61 on nib 68 may effect a slight deflection of the thermo-sensitive member 66 from its proper and normal contact position with respect to the surface 61 at the predetermined temperature. Therefore I prefer to adjust the control device by disposing the same in the setting bath in one of the inclined positions above described rather than in the vertical position.

When a control device of the character just described is immersed in a setting bath, the relationship between the bath temperature and the temperature of the thermo-sensitive member should preferably be such, that the thermo-sensitive member 66, during the adjusting action, will be deflected away from the opposing contact face 61. If the control device is designed to break a circuit under a rising temperature, then the temperature of the thermo-sensitive member 66 should be lower than the bath temperature at the time the control device is placed in the bath, and the temperature of the bath should then be raised to the predetermined temperature. If the control device is designed to break a circuit under a falling temperature, then the temperature of the thermo-sensitive member should be higher than the bath temperature at the time the control device is inserted in the bath, and the temperature of the bath should then be lowered to the desired or predetermined temperature.

As the contact nib 68, during immersing of the device in the bath, is deflected away from the contact surface 61, contact member 60 moves downwardly in openings 58 and 59, this constantly maintaining contact between nib 68 and surface 61. When the predetermined temperature to which the control device is to be adjusted, has been reached, and the deflection of the thermo-sensitive member 66 has stabilized, a suitable source of current is connected in circuit with leads 50 and 51, and there is passed through the circuit a current of sufficient strength to fuse the link 77, whereupon locking member 62 will be released and the sharp end portion 63 thereof will spring into firm engagement with contact member 60 (see Fig. 7) so as to securely lock or set the latter against further movement. If desired, the inner surface 78 of contact member 60 may be coated, with a comparatively soft conductive material, such as copper, silver or a suitable metal foil, to obtain a more positive locking of member 60. The path of the current for fusing link 77 is as follows:

From lead 50 through spring 69, thermo-sensitive member 66, nib 68, contact face 61, contact member 60, bracket 55, fusible link 77, locking member 62, rivets 72 and plate 70 to lead 51. Upon the fusing of link 77 and the locking or setting of the control device, the path of the electric circuit when the contacts are closed, is as follows: From lead 50 through spring 69, thermo-sensitive member 66, nib 68, contact face 61, contact member 60, locking member 62, rivets 72 and plate 70 to lead 51.

The general structural features of the modified form of control device shown in Figs. 11, 12, and 13 are, in many respects, similar to those of the device shown in Figs. 1 to 5A, and where appropriate, the parts of this modification will therefore be designated by the same reference characters as are employed for corresponding parts of the form shown in Figs. 1 to 5A. In this modification, the contact stud 25 is freely mounted in openings 8 and 9 provided in the legs 22 and 23 of a U-shaped member, and the locking spring member 36 is clamped in the position shown in Fig. 11, between legs 22 and 23 in the same manner as in the control device shown in Figs. 1 to 5A. Prior to adjustment of the control device, however, the leg 37 of member 36 is held from engagement with stud 25 by the latch 80 of a latch member 81, in the position shown in Fig. 11. Latch 80 and latch member 81 are integrally formed of magnetic material, and said member is provided with an opening 82 which is slightly larger in diameter than stud 25 and through which the outer end portion of said stud passes. The member 81, at its lower end, is secured to and supported by an easily flexed member 83, which may be formed of weak resilient material, and which is secured by the rivets 24 to the assembly comprising the thermo-sensitive member 18, band 15 and spring 16, the whole switching structure or assembly being supported within the container 10 in the same manner as in the control device shown in Figs. 1 to 5A.

In adjusting and setting the control device last described, I proceed in the same manner as heretofore described in respect of the device shown in Figs. 1 to 5A, except that after the adjustment has been made, the contact stud 25 is locked in the desired position for the device to operate at a predetermined temperature by placing a powerful magnet, indicated at 85 (see Fig. 13), contiguous the outer wall of container 10 adjacent to the upper end of member 81, whereupon the member 81 and latch 80 will under the influence of the magnet 85, be withdrawn from engagement with the spring leg 37, and at the same time member 83 will be flexed. Thereupon the strong spring leg 37 will engage contact stud 25 and securely lock the same in position. If desired the same precautions to insure positive locking of stud 25 may be taken as are heretofore described in respect of the device shown in Figs. 1 to 5A.

Upon adjustment and locking of the contact stud 25 in the desired position as just described, the path of the electric circuit through the control device will be as follows:

From lead 13, through conductor 34, contact stud 32, contact stud 25, legs 22 and 23, spring 16, thermosensitive member 18, and band 15 to lead 11.

The general structural features of the modified form of control device shown in Figs. 14, 15, 16, and 19, are in many respects similar to those of the device shown in Figs. 6 to 10, and accordingly certain parts of such modification will be designated by the same reference characters as used for like parts of the form shown in Figs. 6 to 10.

In the said modification leg 56 of the bracket 55 is provided with a depending arm 90 having an offset end portion 91 which is adapted to engage the inner wall surface of the container 52, and spring 69 presses bracket 55 outwardly so as to maintain the ends of the leg 57 and of the offset portion 91 in firm frictional engagement with said inner wall surface, and coacts with the leads 50 and 51 to support the entire switching assembly properly positioned within the container 52, as shown in Fig. 14. Secured to the arm 90 is a strong spring locking member 92 having a sharpened end 93 which is normally biased by the resiliency of said member to engage contact member 60 having the inclined or biased contact face or surface 61. Secured to the lower end portion of locking member 92 and disposed between the same and the inner wall surface of the container 52, is a member 94 formed of magnetic material and having its lower end adjacent leg 57 of bracket 55. An I shaped member 95 having a reduced portion 96 is disposed for free movement in an opening 97 provided in the leg 57, the arrangement being such (as clearly shown in Figs. 14, 16, and 19) that when the member 95 is slid upwardly in the opening 97 against its own weight, the upper portion thereof will be adapted to engage the lower portion of member 94, but when such member is allowed to assume its normal position under the action of gravity it will be clear of member 94. When member 95 is slid upwardly into engagement with member 94 it will be held in this position under the resiliency of member 92, until member 94 is withdrawn from such engagement, and spring locking member 92 will thereby be maintained out of engagement with contact member 60 so that the latter will be freely movable in the openings 58 and 59 respectively, provided in bracket arms 56 and 57.

Before sealing the control device structure in the container 52, the member 95 is set in engagement with member 94 as above described, and as indicated in Fig. 14, so as to hold locking member 92 away from contact member 60. After adjustment of the control device to operate at a predetermined temperature in the manner hereinbefore described in respect of the device shown in Figs. 6 to 10, a powerful magnet, indicated at 99, is placed contiguous the outer wall surface of container 52 and adjacent to magnetic member 94 while said container is held in vertical or inclined position. Thereupon member 94 is drawn toward the magnet against the action of the spring locking member 92 and pressure is withdrawn from member 95 which will then drop in the opening 97 to the position shown in Fig. 16. Magnet 99 is then removed from the vicinity of container 52 whereupon spring member 92, under its inherent resiliency, assumes a position in which its sharpened end 93 engages contact member 60, thus locking or setting the latter in adjusted position. If desired, the face of contact member 60 which is engaged by the end 93 of member 92 may be faced with some comparatively soft material, such as copper, silver or foil, as described above in respect of the structure shown in Figs. 6 to 10.

The device last described after being once adjusted and set, may be conditioned for further adjustment and setting merely by employing magnet 99 to withdraw member 94 and spring locking member 92 from the position shown in Fig. 16 and then inverting the container end for end so that member 95 will slide under the action of gravity, to a position in which it is adapted to be engaged by member 94 when the magnet is removed. Thus, as exemplified in this modification, a control device in accordance with my invention, may be adjusted and set to operate at a predetermined temperature and either before or after use, may be repeatedly readjusted and set without disturbing the seal of the container thereof.

In the control device shown in Figs. 14, 15, 16, and 19, the path of the electric circuit after setting, is as follows:

From lead 50 through spring 69, thermo-sensitive member 66, contact 68, contact face 61, contact member 60, bracket 55, rivets 72, and conductive plate 70 to lead 51. It is to be noted that plate 70 is insulated from spring 69 and thermo-sensitive member 66 by member 71, and that member 66 is insulated from bracket 55 by member 67. Rivets 72 are also insulated from spring 69 and member 66 by reason of the enlarged openings in such members through which the rivets extend, and by the portions of insulating members which extend partly across such openings and which in effect serve as bushings for the rivets.

In the control device shown in Figs. 17, 18, 20, and 21, as in the form last described, the construction is such that adjustment and locking of the device may be repeatedly effected without disturbing the hermetic sealing of the container. This constitutes an important feature of my invention.

This modified form of my invention comprises an hermetically sealed container 101 having lead wires 102, 103 extending through and sealed in its base 104. Disposed within the container 101 is a U-shaped bracket 105, the legs 106 and 107 of which are adapted to engage the inner wall surface of the container. Secured to bracket 105 as by rivets 109, and assembled in the order named, as clearly shown in Fig. 17, are an insulating member 110, a thermo-sensitive member 111, a spring member 112, an insulating member 113, and a metal plate 114. Thermo-sensitive member 111 curves upwardly and outwardly from bracket 105 and insulation member 110, and is provided with an angularly extending upper end portion having a contact 115 secured thereto. The lower end portion of spring member 112 is in electrical contact with the thermo-sensitive member 111 and has a broad upper end portion adapted to engage the wall of container 101 opposite the engagement thereof by the legs of bracket 105. The frictional engagement of the container wall by bracket 105 and spring 112 under the action of the latter, together with leads 102 and 103, serve to support the entire switch assembly interiorly of the container 101 in the position shown in Fig. 17. Lead 103 is connected to the lower end of spring member 112 and lead 102 is connected to leg 107 of bracket 105.

Legs 106 and 107 of the bracket are respectively provided with aligned openings 116 and 117. The wall of opening 116 is provided with fine screw thread, while the wall of opening 117 is unthreaded. A contact rod 118 having a fine screw thread 118' on its upper portion is adapted to cooperate with the threaded wall of opening 116, extends through the two openings 116 and 117, the latter of which provides a small amount of play for rod 118 and serves as a guide therefor. Mounted on the upper end of rod 118 and, in the construction shown, fixedly secured thereto, is a biased or inclined faced contact member 119 adapted to cooperate with contact 115 for purposes of adjustment and for making contact. It will be understood that I might provide member 119 with suitable threads to cooperate with the threads 118' on rod 118, in which event the rod would be mounted in fixed position in respect to bracket 105. Fixedly secured to the lower portion of member 119 is an annular disc 126 through which rod 118 passes. The outer peripheral surface of disc 126 is slightly roughened as by a series of fine parallel scratches or grooves 127 and is adapted to be lightly engaged by the sharpened tip 128 of a weak spring locking member 129 to prevent inadvertent rotation of member 119 and rod 118. Spring member 129 is formed of magnetic material. Fixedly secured to the top of member 119 is member 120 of magnetic material having pole shoes 121 and 122 respectively conforming to and disposed adjacent the wall of the container.

The control device just described is adjusted by placing the same in a calorimeter or bath of predetermined temperature, and after the thermo-sensitive member 111 has become stabilized at the predetermined temperature, the contact member 119 is rotated until it engages contact 115. This is done by placing a powerful magnet, indicated at 123, with its pole pieces 124, 125 (which conform to the wall of container 101) closely adjacent to the outer wall surface of the container 101 and in alignment with pole shoes 121 and 122, as is clearly shown in Fig. 21, then slowly rotating the magnet 123, so as to slowly change the direction of the magnetic lines of force, and at the same time gently vibrating the control device as by an electric buzzer to dislodge the tip 128 of spring locking member 129 from engagement with grooves or serrations 127 of disc 126, whereupon the contact member 119 and rod 118 will be correspondingly rotated. Instead of employing a vibration to dislodge tip 128 from engagement with grooves 127, I may so dispose a strong magnet (not shown) externally of the container as to flex spring 129 away from disc 126. By reason of the cooperation of the threads 118' on rod 118 with the threads on the wall of opening 116, contact member 119 will upon such rotation thereof, be moved in respect to contact tip 115, and depending upon the direction of the rotation, the biased portion of member 119 will effect relative adjustment of the point of contact between contacts 119 and 115. After the control device has thus been adjusted to operate at a selected temperature the magnet is removed and vibration of the control device is discontinued. The contact member 119 will then be locked in fixed position by reason of the engagement of the threads 118' with the threads on the wall of opening 116, together with the engagement of the grooves 127 by tip 128. It will be obvious, that if desired, and either before or after the use of the control device, repeated adjustments and settings of the control device may be made in the manner above described.

Upon adjustment of the control device, the path of the electrical circuit therein is as follows:

From lead 103 through spring member 112, thermo-sensitive member 111, contact 115, contact 119, rod 118, and bracket 105, to lead 102. It will be noted that spring 112 and thermo-sensitive member 111 are insulated from bracket 105 and rivets 109 by insulating members 110 and 113, which insulating members, as clearly shown in Fig. 20, have portions extending partly across the enlarged openings provided in members 111 and 112 for rivets 109 and, in effect, serving as insulating bushings for such rivets.

That form of control device shown in Figs. 22 to 27, as in the two modified forms last above described, is of such construction that the adjustment and locking or setting thereof may be repeatedly effected after use and without disturbing the hermetic sealing of the container.

The device shown in Figs. 22 to 27 comprises a hermetically sealed container 130 having lead wires 131 and 132 extending through and sealed in its base 133. Disposed within the container 130 is a frame comprising two parallel side members 134 and 135, one extremity of each of said members being bevelled or cut on an incline to provide cam or biased surfaces 136 and 136'.

Adjacent the other extremity thereof said members are connected by a bottom piece 137, preferably formed integrally therewith, the end portions of said bottom 137 being bent to form upstanding flanges 138 and 139 which extend substantially across and between the two side members 134 and 135. (See Figs. 22 and 27.) A spacing member 140 is also disposed between side members 134 and 135 adjacent the biased ends of the latter.

An insulating member 141 is disposed and snugly fits in the space between the side members 134 and 135 and the flanges 138 and 139, and is supported by the bottom piece 137. The bottom portion of insulating block 141 is recessed at 142, and the top portion thereof is slotted at 143 for purposes which will presently be apparent.

A thermo-sensitive member 144, having a suitable contact tip 145 is secured against the lower surface of bottom piece 137. A strong spring member 146 formed of conductive material is disposed in engagement with member 144, both of said members being fixedly secured to bottom piece 137 by rivets 147. Member 146 extends well beyond the bottom piece 137 and is offset and biased to engage the inner surface of container 130, the extending portion of said member 146 being connected with lead wire 132 as indicated at 148.

A spring member 149 formed of conducting material has one end portion disposed and snugly fitting in slot 143 of block 141, the other end portion thereof extending well beyond said block toward the inclined or biased ends 136 and 136' of the side members 135 and 134 and being biased toward member 144. A conductive member 150 has one end thereof suitably secured, as by spot-welding, to the extending end portion of member 149. The other end of member 150 is provided with a suitable contact tip 151 which is disposed in alignment with, and is adapted under the biasing influence of spring 149, to make contact with contact tip 145. A strong spring member 152 is also disposed and snugly fits in slot 143 just above member 149, and has extending end portions 153 and 154 which are biased away from the insulating block 141 and are adapted frictionally to engage the inner surface of container 130. It will be apparent that the extending end portions of members 146 and 152 and the lead wires 131 and 132 cooperate in maintaining the entire switch assembly within the container in the position shown in Fig. 22. The extending end portion 153 of member 152 is connected with lead wire 131 within the container 130.

A rod 155 is slidably mounted for limited longitudinal movement in suitable aligned openings 155a and 155b provided in flanges 138 and 139 respectively (see Fig. 22). As clearly shown in Fig. 25, rod 155 extends through the recess 142 in insulating block 141, and has an enlarged portion providing a shoulder 156 within such recess. To the outer end of the enlarged portion of rod 155 is secured a spring member 157 which is biased toward member 144 and which extends within the space between side members 134, 135 to a point substantially between and adjacent the biased end surfaces 136 and 136'. Secured to the outer end of member 157 as by spot-welding, is a member 158 having flanged portions 159 and 160 which extend between and are but slightly spaced from side members 134 and 135 and are adjacent to the biased or cam surfaces 136 and 136' thereof. A member 161 formed of insulating material is mounted on a pin 162 extending transversely of the flanges 159 and 160. Insulating member 161 is provided with a boss 163 which engages and is secured to the outer extremity of member 157. The ends of pin 162 extend outwardly beyond the flanges 159 and 160 and project over so as to be adapted to be engaged by the biased or cam surfaces 136 and 136' under the pressure of spring 157.

Rod 155 extends beyond flange 138 toward the container base 133 and has the end portion thereof threaded as at 165. A nut 166 formed of magnetic material, is provided with an extension 167 which is internally threaded so as to be adapted to cooperate with the thread 165 on rod 155. Secured to nut 166 is a disc 169, the lateral surface of which is roughened as by fine and preferably parallel serrations 170. Nut 166 is provided with an extension 171 on which disc 169 is fixedly mounted and which is adapted to engage flange 138 when the nut is in operating position on the rod 155. A comparatively weak spring locking member 172 formed of magnetic material, is secured to side member 135 and is provided with a sharp tip 173 biased for light engagement with serrations 170 of disc 169, to thereby set or lock the nut 166 in position on shaft 155. However, as was explained in respect to the modified form last above described, nut 166 may be rotated upon shaft 155 by positioning a powerful magnet with its poles disposed externally of the container and in a position to cause a magnetic flux substantially parallel to the comparatively broad lateral surfaces 174 and 175 of nut 166 and then slowly rotating the magnet, and at the same time either gently vibrating the control device as by an electric buzzer (not shown) or positioning a powerful magnet externally of the container and adjacent spring 172 to release tip 173 from engagement with serrations 170. It is obvious that upon such vibration of the control device a corresponding vibration or slight oscillation will be imparted to weak spring locking member 172 which will suffice to release the tip 173 from locking engagement with the shallow serrations 170 so as to permit the tip to skip or skid over the serrations 170 as the nut is rotated under the influence of the magnet upon rotation of the latter, as above described.

A coiled spring 176 is disposed around rod 155 (see Fig. 22) and is under sufficient compression to slide the rod and the members assembled thereon in the direction of the biased surfaces 136, 136', it being understood that the extension 171 of nut 166 bearing upon flange 138 prevents any such sliding movement except when the nut is so rotated as to be moved on rod 155 toward the container base 133. Spring 176 is held in its compressed state within the cutaway portion 142 of block 141 by engagement at one end with shoulder 156 of rod 155 and by engagement at the other end with the inner surface of flange 138. A stop lug 177 on rod 155 limits the longitudinal movement of such rod under the influence of spring 176.

It will be obvious that if nut 166 is rotated on shaft 155 in a direction for effecting movement of the nut toward the left hand end of the shaft (referring to Fig. 22), then the shaft, spring member 157 and insulation member 161 will be moved by spring 176 toward contact tips 145 and 151. If on the other hand nut 166 is rotated in the opposite direction, then the rod 155 together with spring member 157 and insulation member 161 will be moved to the left or away from contact tips 145 and 151, by reason of engagement of the extension 171 with flange 138.

It will also be obvious that when the rod 155 is moved longitudinally in one direction or the other, the ends of pin 162 which are respectively in engagement with the cam or biased inclined end surfaces 136 and 136' will be raised or lowered accordingly, as will also insulating member 161 which is in engagement with, and supports, against the biasing influence of spring 149, the member 150 carrying contact tip 151. Hence contact tip 151 may be moved into or away from engagement with contact tip 145 at will by rotating nut 166.

The control device just described is adjusted by placing the same in a bath maintained at a suitable temperature, and after the thermo-sensitive member has become stabilized at the desired predetermined temperature, rotating the nut 166 on shaft 155 in the proper direction an amount sufficient to bring contact tip 151 into engagement with contact tip 145. As hereinbefore indicated, nut 166 may be rotated without breaking the seal of the container by using a powerful magnet, as shown in Fig. 21. After the control device has been thus adjusted to operate at the selected temperature the magnet is removed, and the nut 166 is locked or set by reason of the engagement of the tip 173 with one of the serrations 170. It is obvious that repeated adjustments may be made, either before or after use of the control device.

Upon proper adjustment of the control device, the path of the electrical circuit therein is as follows: From lead 132 through member 146, thermo-sensitive member 144, contact tip 145, contact tip 151, member 150, member 149 and member 152 to lead 131. It is to be noted that the insulating block 141 and insulating member 161 electrically insulate that side of the said circuit which includes lead 131 and contact 151 from the side thereof which includes lead 132 and contact 145, except through engagement of said contacts.

In any of the various forms of control devices embodying my invention, the adjustment thereof, and in the case of any of the modifications shown in Figs. 1 to 5A, and Figs. 6 to 10, the setting or locking thereof in adjustment as well, may be facilitated by connecting the control device in a suitable electric circuit.

I may use a circuit such as shown in Fig. 28 in the adjustment of any of my control devices and also for the setting or locking of that form of control device shown in Figs. 6 to 10. Referring to Fig. 28, reference character 180 represents a suitable source of electric energy, such as a storage battery, having one pole thereof connected by a conductor 181 to a signal device 182, such as an electric lamp, which is shunted across a normally open switch 183. Reference character 184 represents a conductor which has a series resistance 185 therein and which connects the switch 183 to one terminal or lead-in-wire 186 of the control device 187. Said device has an internal circuit comprising lead-in-wires 186 and 192, contact members 188 and 189, fusible link 190, and suitable connecting conductors, such internal circuit being that of the control device shown in Figs. 6 to 10. Lead-in-wire 192 of the control device 187 is connected by a conductor 191 to that pole of battery 180 which is opposite to the pole connected to conductor 181.

In the circuit arrangement just described and with the switch 183 open, the contact members 188 and 189 of the control device 187 are adjusted to make or break contact at a predetermined temperature, in a manner hereinbefore explained. Thereupon signal 182 will indicate that contact is made or broken, as the case may be. I desire to make it clear that the circuit shown in Fig. 28 may be used, as just described, in adjusting any or all the various control devices embodying my invention, to obtain a signal when proper adjustment of the control device is effected. The specific form of control device shown in Figs. 6 to 10, however, may after being properly adjusted when connected in the circuit shown in Fig. 28, then be locked or set in adjustment merely by closing the switch 183. The signal 182, which is of comparatively high resistance, will thus be by-passed. This reduces the resistance of the circuit which includes the fusible link 190, thereby permitting sufficient current to flow to fuse such link and effecting the permanent setting or locking of the control device in the desired adjustment. The purpose of resistance 185 is to prevent too great a flow of current in the circuit of link 190 upon closing the switch 183, as I have found that without this resistance enough heat may be generated to cause contacts 188 and 189 to be fused together or to otherwise damage the control device. The resistance 185 should be such as to permit sufficient current to flow in the circuit of link 190 to fuse the latter, and at the same time to prevent the generation of such heat within the control device as would be likely to damage the latter.

In Fig. 29 is shown a circuit which may be employed in adjusting and setting the form of control device shown in Figs. 1 to 5A. It will be understood that this form of control device could also be adjusted, although not readily set or locked in adjustment when connected in the circuit shown in Fig. 28. Referring to Fig. 29, reference character 193 represents a suitable source of electric energy such as a storage battery. A conductor 194 connects one pole of said battery to the lead-in-wire or terminal 195 of the control device 196. A suitable signal device 197 such as an electric lamp, is connected in series in conductor 194. The other pole of battery 193 is connected by a conductor 198 to the lead-in-wire or terminal 199 of the control device. The third lead-in-wire or terminal 200 of the control device 196 (corresponding to the device shown in Figs. 1 to 5A) is connected to the fusible link 201 internally of the control device. Externally of the control device lead-in-wire 200 is connected to a conductor 202 having in series therewith a suitable resistance 203. Conductor 202 is adapted to be connected to conductor 194 through a normally open switch 204. Internally of the control device contacts 205 and 206 are respectively connected to lead-in-wires 195 and 199, and fusible link 201 is connected to a conductor 207 which in turn is also connected to lead-in-wire 199. Thus the branch of the circuit comprising switch 204, resistance 203, conductor 202, lead-in-wire 200, fusible link 201 and conductor 207 is in parallel relation to the side or branch circuit comprising conductor 194, signal device 197, lead-in-wire 195 and contacts 205 and 206, and the latter branch may be shunted by closing the switch 204.

Upon effecting proper adjustment of the control device 196 as heretofore explained, when the same is connected in the circuit shown in Fig. 29, a suitable signal will be given by the signal device 197. Thereupon switch 204 is closed, which results in the passage of sufficient current through link 201 to fuse the latter and thereby effect the setting or locking of the control device in the desired adjustment. Resistance 203 should be of an amount to permit the passage of a current of sufficient strength to fuse link 201, but at the same time to so limit the strength of the current as to prevent the generation of such a degree of heat within the control device as would be likely to result in damage to the latter.

Thus in adjusting any form of my control device when connected in either of the circuits shown in Figs. 28 and 29, a definite signal will be given when the contact members are in the proper and desired relative position. Also should the control device shown in Figs. 6 to 10 be connected in the circuit shown in Fig. 28, such control device may thereupon be fixedly set or locked in adjustment by throwing the switch 183 so as to fuse link 190 and thereby release the locking means of the control device. Likewise should the form of control device shown in Figs. 1 to 5A be connected in the circuit shown in Fig. 29, such control device may be set or locked in the proper and desired adjustment by throwing the switch 204 so as to fuse link 201 and release the locking member of the control device.

As various changes may be made in the form, construction and arrangement of parts included in the above described preferred embodiments, without departing from the scope and spirit of my invention, all matter herein contained is intended to be considered as illustrative and not in a limiting sense.

Having thus described my invention, what I claim and desire to secure by Letters Patent, is:

1. In a device of the class described, a sealed container, a switching structure mounted within said container and comprising a thermo-sensitive member and a plurality of electrical contacts, at least one of said contacts being movable under the influence of said member, and at least one of said contacts being mounted for adjustment in respect to said movable contact, and means for effecting the locking of said adjustable contact in adjustment with the seal of said container intact.

2. In a device of the class described, a sealed container, a switching structure mounted within said container, said structure comprising electrical contacts adapted to open or close an electrical circuit, one of said contacts being movable under thermal influence, another of said contacts being mounted for adjustment in respect to said movable contact, and means for locking said adjustable contact in desired adjustment, said means being operable while the seal of said container is intact.

3. In a device of the class described, a sealed container, a switching structure within said container, said structure comprising a thermo-sensitive member, a pair of electrical contacts, one of said contacts being movable under the influence of said member, another of said contacts being adjustable in respect to said movable contact, means for adjusting the latter contact, and means for locking the adjustable contact in adjusted position, said adjusting and locking means being respectively operable at will while said switching structure is sealed within said container.

4. In a device of the class described, a sealed container, a switching structure within said container, said structure comprising a pair of electrical contacts adapted to engage and disengage each other, means for adjusting one of said contacts in respect to the other, and means for locking said adjustable contact in adjusted position, said locking means being operable without breaking the seal of said container.

5. In a device of the class described, in combination, a sealed container, a switching structure within said container, said structure comprising a thermo-sensitive member, a plurality of electrical contacts, at least one of said contacts being movable under the influence of said member and another one of said contacts being mounted for adjustment in respect to said movable contact, and a locking member adapted to lock said adjustable contact, and a high resistance fusible link adapted to hold said locking member out of locking position, said fusible link before fusing thereof being electrically in circuit with certain of the parts of the switching structure.

6. In a device of the class described, a sealed container, a switching structure disposed within said container and having leads extending exteriorly of the container, said structure comprising a plurality of electrical contacts, at least one of said contacts being adjustable in respect to another of said contacts, a member adapted normally to lock said adjustable contact in adjustment, and a high resistance fusible member for securing said locking member in unlocking relation, said link before fusing thereof being electrically in circuit with certain of the switching structure parts including at least two of said leads.

7. In a device of the class described, a sealed container, a switching structure within said container, said structure comprising a movable electrical contact member, an electrical contact member adjustable in respect to said movable contact member, and an element adapted to lock said adjustable contact member in adjusted position, said element being controllable to effect movement thereof either to or from locking position at will.

8. In a device of the class described, a sealed container, a switching structure within said container, said structure comprising a pair of electrical contact members, one of said contact members being adjustable in respect to the other, said adjustable contact member being arranged to constitute part of an electric circuit, an element adapted to lock the adjustable contact member in adjusted position, means comprising a high resistance fusible link adapted to hold said locking element out of locking position, said link being arranged to constitute part of an electric circuit which includes a portion of said first-named electric circuit but which by-passes said adjustable contact member.

9. In a device of the class described, a switching structure sealed within a container, said structure comprising electrical contacts, one of said contacts being adjustable in respect to another, and a spring member adapted to lock said adjustable contact in adjusted position, and means for rendering said spring member ineffective to lock said adjustable contact.

10. In a device of the class described, a sealed container, a switching device within said container comprising electrical contact members, one of said members being mounted for adjustment in respect to another, a spring element adapted to lock said adjustable member in adjusted position, said spring element being biased to locking position, and means for maintaining said spring element out of locking position and controllable to release said spring element.

11. In a device of the class described, a sealed container, a switching structure within said container, said structure comprising a pair of electrical contact members, one of said members being adjustably mounted in respect to the other, means for locking said adjustable member in adjusted position, and means for holding said locking means inoperative, said holding means comprising magnetic material and being operable to release said locking means under the influence of a magnet positioned exteriorly of said container.

12. In a device of the class described, a sealed container, a switching structure within said container comprising electrical contact members, one of said members being adjustable in respect to another of said members, resilient means adapted to lock said adjustable member in adjusted position, and means comprising magnetic material adapted to hold said locking means out of locking position, said latter means being operable to release said locking means under the influence of a magnet positioned exteriorly of said sealed container.

13. In a device of the class described, a sealed container, a switching structure within said container, said structure comprising a plurality of electrical contact members, at least one of said members being adjustable in respect to another of said members and being adapted to be adjusted within said sealed container, means for locking said adjustable member in adjustment comprising a resilient element, and means formed of magnetic material associated with said resilient element and adapted to hold said locking means out of locking position.

14. In a device of the class described, a sealed container, a switching structure mounted within said container, said switching structure comprising electrical contact members, one of said members being adjustable in respect to another, and means comprising magnetic material for adjusting said adjustable member, said means being operable under the influence of a magnet placed exteriorly of said container.

15. In a device of the class described, a sealed container, a switching structure within said container, said structure comprising electrical contact members, one of said members being adjustable in respect to another, means for adjusting said adjustable member, said means comprising an element of magnetic material, and means for locking said adjusting means.

16. In a device of the class described, a sealed container, a switching structure within said container, said structure comprising electrical contact members, one of said members being adjustable in respect to another, means for adjusting said adjustable member, said means comprising an element of magnetic material, and means for locking said adjusting means, said locking means comprising a resilient device and being adapted to be released from locking position by vibration of the container.

17. In a device of the class described, a sealed container, a switching structure within said container, said structure comprising electrical contact members, one of said members being adjustable in respect to another, means for adjusting said adjustable member, said means comprising an element of magnetic material, and means for locking said adjusting means, said locking means being adapted to be released from locking position by vibration of the container and to automatically assume locking position upon cessation of vibration.

18. In a device of the class described, a sealed container, a switching structure within said container, said structure comprising electrical contact members, one of said members being adjustable in respect to another, means for adjusting said adjustable member, said means comprising an element of magnetic material, and means for locking said adjusting means, said locking means comprising magnetic material and being adapted to be released from locking position under the influence of a magnet.

19. In a device of the class described, a sealed container, a switching structure within said container, said structure comprising electrical contact members, one of said members being adjustable in respect to another, means for adjusting said adjustable member, and means for locking said adjusting means, said locking means comprising magnetic material and being adapted to be released from locking position under the influence of a magnet and to automatically assume said position upon removal of such magnetic influence.

20. In a device of the class described, a sealed container, a switching structure sealed within said container, said structure comprising a plurality of electrical contact members, at least one of said members being adjustable in respect to another, and means for adjusting one of said members in respect to another, said means comprising magnetic material.

21. In a device of the class described, a sealed container, a switching device within said container, said switching device comprising a plurality of electrical contact members, a thermo-sensitive member, at least one of said contact members being movable under the influence of said thermo-sensitive member and at least one of said contact members being adjustable in respect to said movable member, and means for adjusting said adjustable member, said means including a cam surface, a member for engaging such surface, and means for changing the relative position of said last-named member and said surface in respect to each other.

22. In a device of the class described, a sealed container, a switching device within said container, said switching device comprising a pair of electrical contact members, a thermo-sensitive member, one of said contact members being movable under the influence of said thermo-sensitive member and one of said contact members being adjustable in respect to said movable member, and means for adjusting said adjustable member, said means comprising an element provided with a biasing surface, a member for engaging such surface, and means comprising a slidably mounted member for changing the position of said engaging member in respect to said surface.

23. The method of producing a device of the class described, which consists in sealing within a container an adjustable switching structure having means for locking the same in adjustment and means comprising a member of high resistance electrical conducting material holding said locking means inoperative, then adjusting said switching structure, and then releasing said locking means by fusing said member.

24. The method of producing a device of the class described, which consists in disposing within a container a switching structure comprising an adjustable contact member, then sealing said container, then subjecting said container to vibration, and then adjusting said member while said container is vibrating.

25. The method of producing a device of the class described, which consists in sealing within a container a switching structure having an adjustable electrical contact member, a member biased to lock said contact member against adjustment and magnetic means holding said locking member inoperative, then adjusting said contact member to desired position and then disposing a magnet externally of the container and adjacent said holding means to render the latter inoperative so as to release said locking member and effect the locking of said contact member in adjusted position.

26. The method of producing a device of the class described, which consists in disposing within a container a switching structure having an adjustable magnetic element, then sealing said container, then adjusting said magnetic element by moving a magnet externally of the container and adjacent such element.

27. The method of producing a device of the class described, which consists in disposing within a container a switching structure having an adjustable magnetic element and a member biased to lock such element against adjustment, sealing said container, then rendering said locking member ineffective by vibrating said container while moving a magnet externally of the sealed container and adjacent to said adjustable element to effect movement of the adjustable element to desired position, and then discontinuing the vibration of said container so as to render said locking member effective.

28. The method of producing a device of the class described, which consists in placing within a container an adjustable switching structure having magnetic means biased to lock the same against adjustment, sealing said container, then positioning a magnet externally of the sealed container and adjacent to said magnetic locking means to render the latter ineffective, then adjusting said switching structure as desired, and then removing said magnet to release said locking means and permit the same to lock said switching structure in adjustment.

29. In a device of the class described, a sealed container and a switching structure within said container, said structure comprising electrical contact members for engagement at a predetermined point, an element having a biased face, another element for engaging said biased face and means operable while said container is sealed for moving one of said elements to effect a change in the point of engagement of said contact members.

30. In a device of the class described, a closed container and a switching structure within said container, said structure comprising an adjustable electrical contact, means for adjusting said contact to a desired position within said closed container, and means operable within said closed container to lock and to unlock at will said contact in adjusted position.

31. In a device of the class described, a sealed container and a switching structure within said container, said structure comprising electrical contact members, one of said members being spring influenced toward a position in respect to engagement with another of said members and means operable while said container is sealed for adjusting one of said members in respect to the other, said means including an inclined surface and a member adapted to cooperate with said surface to effect a change of position of said spring influenced contact member.

32. In a device of the class described, a sealed container and a switching structure within said container, said structure comprising an electrical contact member resiliently influenced toward a given position within said container, a biased surface, and means operable while said container is sealed for cooperating with said biased surface to determine the position of said resiliently influenced member within said container.

33. In a device of the class described, a sealed container and a switching structure within said container, said structure comprising electrical contact members, one of which members is spring influenced and adjustable in respect to another of said members, and means operable while said container is sealed for adjusting said spring influenced member, said means comprising a cam surface.

34. In a device of the class described, a sealed container and a switching structure within said container, said structure comprising an adjustable electrical contact member and means operable while said container is sealed for adjusting said member, said means comprising a resilient element and a cam surface.

35. In a device of the class described, a sealed container, an adjustable switching structure within said container, means for adjusting said switching structure and means within said sealed container for positively locking said switching structure in adjustment.

36. In a device of the class described, a sealed container, and a switching structure within said sealed container, said structure comprising relatively movable cooperative contacts and thermo-sensitive means for controlling the switching action of such structure, means for adjusting said structure to vary the control of such switching action by said thermo-sensitive means, means actuatable while the said container is sealed to effect the positive locking of said structure in selected adjustment, and said locking means being within said sealed container.

CHARLES W. DANN.